United States Patent
Mody

(10) Patent No.: US 11,228,769 B2
(45) Date of Patent: Jan. 18, 2022

(54) MULTI-THREADING IN A VIDEO HARDWARE ENGINE

(71) Applicant: Texas Instruments Incorporated, Dallas, TX (US)

(72) Inventor: Mihir Narendra Mody, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1083 days.

(21) Appl. No.: 14/294,711

(22) Filed: Jun. 3, 2014

(65) Prior Publication Data

US 2014/0355691 A1 Dec. 4, 2014

(30) Foreign Application Priority Data

Jun. 3, 2013 (IN) .......................... 2430/CHE/2013

(51) Int. Cl.
*H04N 19/174* (2014.01)
*H04N 19/436* (2014.01)

(52) U.S. Cl.
CPC ......... *H04N 19/174* (2014.11); *H04N 19/436* (2014.11)

(58) Field of Classification Search
CPC .......................... H04N 19/174; H04N 19/436
USPC ........................................ 375/240.25, 240.26
See application file for complete search history.

(56) References Cited

U.S. PATENT DOCUMENTS

| | | | | |
|---|---|---|---|---|
| 6,366,970 B1* | 4/2002 | Wolff | ................ | H04N 21/4435 375/E7.026 |
| 6,643,405 B1* | 11/2003 | Sako | ................... | H04N 1/33307 348/E5.086 |
| 7,127,520 B2* | 10/2006 | Ladd | ...................... | H04L 29/06 345/505 |
| 8,127,058 B1* | 2/2012 | Sha | ........................ | H04N 19/44 710/52 |
| 8,223,845 B1* | 7/2012 | Duvivier | ................ | H04N 19/80 375/240.24 |
| 8,311,111 B2* | 11/2012 | Xu | ........................ | H04N 19/51 375/240.08 |
| 8,705,616 B2* | 4/2014 | He | ........................ | H04N 19/30 375/240.02 |
| 2005/0262510 A1* | 11/2005 | Parameswaran | .... | G06F 15/7842 718/105 |

(Continued)

*Primary Examiner* — On S Mung
(74) *Attorney, Agent, or Firm* — Charles F. Koch; Charles A. Brill; Frank D. Cimino

(57) ABSTRACT

A video hardware engine with multi-threading functionality is disclosed. The video hardware engine includes a video hardware accelerator unit and a controller. The controller is coupled to the video hardware accelerator unit. The controller operates in an encode mode and a decode mode. In the encode mode, the controller receives a plurality of frames and encode attributes associated with each frame of the plurality of frames. The encode attributes associated with a frame of the plurality of frames is processed to generate encode parameters associated with the frame. The video hardware accelerator unit is configured to process the frame based on the encode parameters to generate an output. The output of the video hardware accelerator unit is processed to generate a compressed bit-stream and an encode status. In decode mode, the controller receives a compressed bit-stream and decode attributes and generates a plurality of frames and a decode status.

18 Claims, 5 Drawing Sheets

(56) References Cited

U.S. PATENT DOCUMENTS

| | | | | |
|---|---|---|---|---|
| 2007/0074004 A1* | 3/2007 | Wong | ................ | G06F 9/30003 |
| | | | | 712/34 |
| 2007/0133688 A1* | 6/2007 | Tjandrasuwita | ....... | H04N 19/61 |
| | | | | 375/240.21 |
| 2007/0286288 A1* | 12/2007 | Smith | .................. | H04N 19/44 |
| | | | | 375/240.24 |
| 2008/0107184 A1* | 5/2008 | Katsavounidis | ....... | H04N 19/44 |
| | | | | 375/240.25 |
| 2008/0187053 A1* | 8/2008 | Zhao | .................. | H04N 19/513 |
| | | | | 375/240.25 |
| 2008/0205512 A1* | 8/2008 | Lee | ........................ | H04N 19/42 |
| | | | | 375/240.01 |
| 2009/0201993 A1* | 8/2009 | MacInnis | ............. | H04N 19/433 |
| | | | | 375/240.16 |
| 2009/0252499 A1* | 10/2009 | Rotgaizer | .......... | H04B 10/1123 |
| | | | | 398/131 |
| 2010/0138614 A1* | 6/2010 | Glasco | ................ | G06F 12/0875 |
| | | | | 711/144 |
| 2010/0169892 A1* | 7/2010 | Stam | .................... | G06F 9/5027 |
| | | | | 718/105 |
| 2010/0254616 A1* | 10/2010 | Abdo | .................... | G06F 9/4445 |
| | | | | 382/232 |
| 2010/0332909 A1* | 12/2010 | Larson | ................ | G06F 11/3476 |
| | | | | 714/40 |
| 2011/0274178 A1* | 11/2011 | Onno | .................... | H04N 19/70 |
| | | | | 375/240.25 |
| 2011/0280307 A1* | 11/2011 | MacInnis | .................. | G06T 9/00 |
| | | | | 375/240.15 |
| 2012/0140816 A1* | 6/2012 | Franche | ............... | H04N 19/172 |
| | | | | 375/240.03 |
| 2013/0028332 A1* | 1/2013 | Le Leannec | ........... | H04N 19/86 |
| | | | | 375/240.25 |
| 2013/0051478 A1* | 2/2013 | Wu | ...................... | H04N 19/159 |
| | | | | 375/240.25 |
| 2013/0159811 A1* | 6/2013 | Biran | ..................... | H03M 7/30 |
| | | | | 714/758 |
| 2013/0188732 A1* | 7/2013 | Zhou | .................... | H04N 19/44 |
| | | | | 375/240.24 |
| 2013/0223532 A1* | 8/2013 | Xi | ......................... | H04N 19/56 |
| | | | | 375/240.16 |
| 2014/0078020 A1* | 3/2014 | Yamada | .................. | G06F 3/147 |
| | | | | 345/1.1 |
| 2014/0153635 A1* | 6/2014 | Zhang | ................. | H04N 19/423 |
| | | | | 375/240.02 |
| 2014/0334545 A1* | 11/2014 | Schmit | ................ | H04N 19/105 |
| | | | | 375/240.15 |
| 2015/0212934 A1* | 7/2015 | Shanmugam | ............. | G06F 9/46 |
| | | | | 711/154 |
| 2016/0180489 A1* | 6/2016 | Kim | ........................ | G06T 1/20 |
| | | | | 345/522 |

* cited by examiner

MULTI-THREADING IN A VIDEO HARDWARE ENGINE

CROSS REFERENCES TO RELATED APPLICATIONS

This application claims priority from India provisional patent application No. 2430/CHE/2013 filed on Jun. 3, 2013, which is hereby incorporated by reference in its entirety.

TECHNICAL FIELD

Embodiments of the disclosure relate generally to video hardware engines and more particularly to multithread processing of video frames in video hardware engines.

BACKGROUND

The need for high computation power for video coding especially in video coding standards such as MPEG2, H.264 and HEVC (high efficiency video coding) has led to hardware based solutions for video hardware engine, which is controlled by a controller in a SoC (system on chip). The video hardware engine uses the controller to configure the video hardware engine and also to control the video hardware engine operation using a firmware. The firmware running on the controller uses simple, sequential and non-pipelined model for video processing on video hardware engine because of lack of a real time OS (operating system) and low availability of on-chip memory. This solution works well for simple video playback scenario. In case of applications such as video surveillance which requires a large number of channels of lower resolutions or applications such as video conferencing where a higher number of slice processing is required, such applications results in lower utilization of video hardware engine as inefficiencies become significant resulting in lower performance. In case of high speed cameras and camcorders used in applications such as sports and scientific experiments, the frame overhead in a video input becomes significant. This result in lower utilization of the video hardware engine as most of the time in video hardware engine is used in parsing the video input and configuration of the video hardware engine. Also, the demand for higher visual quality and immersive experience is driving a need to support ultra-HD resolutions in portable devices like smartphones and tablets. Low power and multi-format support are other critical requirements in these mobile applications.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

A video hardware engine includes a video hardware accelerator unit and a controller. The controller is coupled to the video hardware accelerator unit. The controller operates in an encode mode and a decode mode. In the encode mode, the controller receives a plurality of frames and encode attributes associated with each frame of the plurality of frames. Each frame is divided in a plurality of slices. The encode attributes associated with a frame of the plurality of frames is processed to generate encode parameters associated with the frame. The video hardware accelerator unit is configured to process the frame based on the encode parameters to generate an output. The output of the video hardware accelerator unit is processed to generate a compressed bit-stream and an encode status. In decode mode, the controller receives a compressed bit-stream and decode attributes and generates a plurality of frames and a decode status.

Other aspects and example embodiments are provided in the Drawings and the Detailed Description that follows.

BRIEF DESCRIPTION OF THE VIEWS OF DRAWINGS

DETAILED DESCRIPTION OF THE EMBODIMENTS

Figure 1:
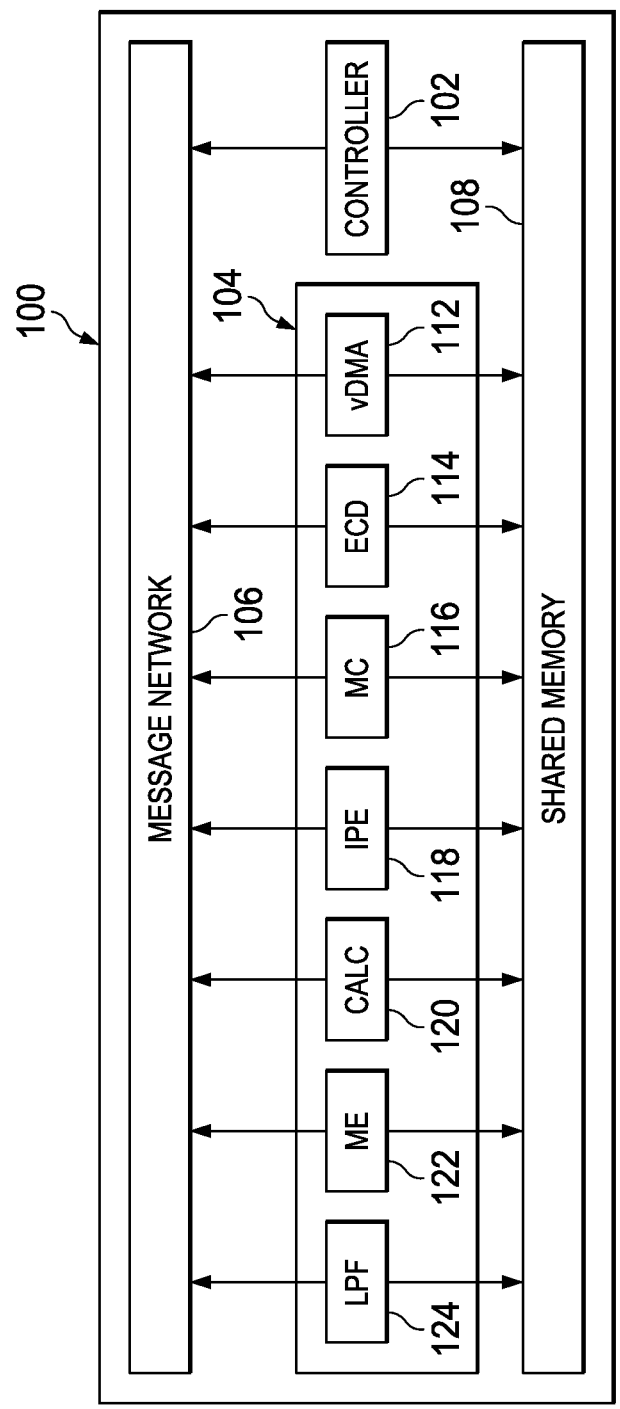
FIG. 1 illustrates a block diagram of a video hardware engine, according to an embodiment.

FIG. 1 illustrates a block diagram of a video hardware engine 100, according to an embodiment. The video hardware engine 100 includes a controller 102 and a video hardware accelerator unit 104. In an example, the controller 102 is a low-end processing unit. In another embodiment, the controller 102 is a RISC (reduced instruction set computing) processor. In one example, the video hardware engine 100 includes a plurality of controllers. The controller 102 and the video hardware accelerator unit 104 communicate through a message network 106. The controller 102 and the video hardware accelerator unit 104 both use a shared memory 108.

The video hardware accelerator unit 104 includes hardware accelerator engines, which include the following, but not limited to, a video direct memory access (vDMA) engine 112, an entropy codec (ECD) engine 114, a motion compensation (MC) engine 116, a spatial intra prediction (IPE) engine 118, a transform and quantization (CALC) engine 120, a motion estimation (ME) engine 122 and a de-blocking filter (LPF) engine.

In one version, the video hardware accelerator unit 104 includes a plurality of hardware accelerator engines. All the hardware accelerator engines in the video hardware accelerator unit 104 communicate with each other and with the controller 102 through the message network 106. The hardware accelerator engines are also coupled to the shared memory 108 for exchange of data. The video hardware engine 100 is one of the following, but not limited to, a multi-format video decoder, a multi-format video encoder and a multi-format encoder and decoder. The multi-format encoder and decoder support functionality of both an encoder and a decoder. A multi-format video hardware engine supports various video formats such as, but not limited to, MPEG2, HEVC and H.264. The video hardware engine 100 may include one or more additional components known to those skilled in the relevant art and are not discussed here for simplicity of the description.

The operation of the video hardware engine 100 illustrated in FIG. 1 is explained now. The controller 102 is configured to operate in an encode mode and a decode mode. In encode mode, the controller 102 receives a plurality of frames and encode attributes associated with each frame of the plurality of frames, from a processing unit external to the video hardware engine 100. The video hardware engine 100 processes the plurality of frames and the encode attributes to generate a compressed bit-stream and an encode status. The controller 102 provides the compressed bit-stream and the encode status to the processing unit external to the video hardware engine 100.

In decode mode, the controller 102 receives a compressed bit-stream and decode attributes from the processing unit. The video hardware engine 100 processes the compressed bit-stream and the decode attributes to generate a plurality of frames and a decode status. The controller 102 provides the plurality of frames and the decode status to the processing unit.

The vDMA engine 112 transfers the plurality of frames, encode attributes associated with each frame, the compressed bit-stream and decode attributes; from the shared memory 108 to a memory external to the video hardware engine 100 and vice-versa. The ME engine 122, during the encode mode, estimates motion information from a frame of the plurality of frames. The IPE engine 118, during the encode mode, generates a predicted frame for a current frame. The CALC engine 120, during the encode mode, inversely quantizes the predicted frames and perform inverse transform on the result of inverse quantization. The CALC engine 120, during the decode mode, quantizes the compressed bit-stream and perform transform on the result of quantization. The MC engine 116 performs motion compensation on the motion information associated with the frames/compressed bit-stream. The LPF 124 filters an output of the CALC engine 120 and is used for improving video quality. The ECD engine 114, in encode mode, generates a preliminary compressed bit-stream and preliminary encode status. The preliminary compressed bit-stream and the preliminary encode status are further processed in the controller 102 to generate a compressed bit-stream and encode status. The ECD engine 114, in decode mode, generates a preliminary frame and a preliminary decode status. The preliminary frame and the preliminary decode status are further processed in the controller 102 to generate a frame and an encode status.

The controller 102 operates in the encode mode when the controller 102 receives a plurality of frames and encode attributes associated with each frame of the plurality of frames. Each frame is further divided in a plurality of slices. The controller 102 processes the encode attributes associated with a frame of the plurality of frames and generates encode parameters associated with the frame.

The controller 102 also configures the video hardware accelerator unit 104 to process the frame based on the encode parameters associated with the frame. The video hardware accelerator unit 104 generates an output which is processed by the controller 102 and the controller 102 generates a compressed bit-stream and an encode status.

In one example, the controller 102 receives the plurality of frames and the plurality of frames includes a previous frame, a current frame and a next frame. The controller 102 performs a set of predefined tasks in parallel. The set of predefined tasks are explained now. The controller 102 schedules each frame of the plurality of frames. The controller 102 processes encode attributes associated with the next frame to generate encode parameters associated with the next frame. The controller 102 processes a plurality of slices associated with the current frame. The controller 102 configures the video hardware accelerator unit 104 to process the current frame based on the encode parameters associated with the current frame.

The video hardware accelerator unit 104 processes a previous frame to generate an output which is processed by the controller 102 to generate a compressed bit-stream corresponding to the previous frame and an encode status corresponding to the previous frame. The controller 102 is configured to collate a compressed bit-stream and an encode status associated with a set of frames of the plurality of frames to generate a collated compressed bit-stream and a collated encode status. The controller 102 communicates with a processing unit external to the video hardware engine 100 and provides the collated compressed bit-stream and the collated encode status associated with the set of frames to the processing unit.

The set of predefined tasks are performed by the controller 102 in parallel. In an embodiment, a plurality of predefined tasks performed by the controller 102 is in parallel. The specifically disclosed operations and sequences of the predefined tasks are provided to explain the logical flow of functioning of the controller 102 and are understood not to limit the scope of the present disclosure.

The controller 102 includes a set of threads and a thread of the set of threads is associated with one or more predefined tasks of the set of predefined tasks. Each thread has a predefined priority. The operation of the controller 102 in the encode mode is now explained in association with the threads. In one version, the set of threads include a communication thread, a kernel thread, a frame thread, a hardware thread and a slice thread.

The communication thread communicates with the processing unit external to the video hardware engine 100. The kernel thread schedules each frame of the plurality of frames. The frame thread processes encode attributes associated with a frame of the plurality of frames and generates encode parameters associated with the frame. The hardware thread configures the video hardware accelerator unit 104 to process the frame based on the encode parameters associated with the frame. The slice thread is configured to process a plurality of slices associated with the frame.

The frame thread processes the output of the video hardware accelerator unit 104 to generate the compressed bit-stream and the encode status associated with the frame. The kernel thread is configured to collate the compressed bit-stream and the encode status associated with a set of frames of the plurality of frames to generate a collated compressed bit-stream and a collated encode status. The communication thread provides the collated bit-stream and the collated encode status associated with the set of frames to the processing unit.

In another version, the set of threads includes a first thread and a second thread and the first thread has a first priority and the second thread has a second priority. The first priority is higher than the second priority i.e., the first thread is a high priority thread and the second thread is a low priority thread. When a predefined task is assigned to the first thread, the first thread is configured to complete the predefined task before initiating a subsequent predefined task.

In one example, the second thread or the low priority thread switches from the second priority to the first priority i.e. from low priority to high priority. Therefore, the high priority thread completes the assigned predefined task before starting on a next task. Thus, a thread in the controller 102 initiates and completes a predefined task and therefore the thread cannot be blocked during execution of the predefined task.

Each thread in the controller 102 does not operate in wait mode, yield mode and suspend mode. In conventional threading mechanisms, a thread is configured to wait till other threads are operational (wait mode) or a thread is configured to operate at lesser processing speed (yield mode) or a thread is suspended or halted in view of other priority tasks (suspend mode). A thread in the controller 102 completes a predefined task and is initiated again when the controller 102 assigns a new predefined task. Thus, a thread scheduler is not required in the controller 102. This is different from conventional threading mechanisms using operating system in which a thread is always running and exiting of thread is not an option.

The controller 102 is capable of merging threads. Also, the controller 102 is capable of duplicating any thread of the set of threads. In one example, the controller 102 merges the first thread and the second thread to create a merged thread. The merged thread is configured to perform one or more of the predefined tasks. In another example, the controller 102 duplicates a first thread to create two or more sub-thread. Each sub thread of the two or more sub-threads is configured to perform one or more of the predefined tasks.

Each predefined task of the set of predefined tasks has an input queue and an output queue. A thread has an input queue and an output queue when one predefined task is associated with the thread. A thread has multiple input queues and multiple output queues when more than one predefined task is associated with the thread.

A queue is used for transmitting and receiving data across the threads. In one example, the queue is implemented as an array with read and write index. In an additional example, if there is bi-directional transmit and receive of data in a thread, two input queues and two output queues are associated with the thread. A thread activation semaphore is configured to activate a thread and an input queue activation semaphore is configured to activate an input queue. Thus, each thread receives a thread activation semaphore to activate the thread, and each input queue receives an input queue activation semaphore to activate an input queue associated with the thread.

In the above discussed second version, the first thread is associated with a first input queue and a first output queue and the second thread is associated with a second input queue and a second output queue. When the controller 102 is performing the set of predefined tasks, the first input queue associated with the first thread receives a data, a first thread activation semaphore and a first input queue activation semaphore.

The first thread activation semaphore activates the first thread and the first input queue activation semaphore activates the first input queue. The first thread processes the data to generate a processed data. The first thread provides the processed data, a second thread activation semaphore, a second input queue activation semaphore to the first output queue.

The second input queue associated with the second thread receives the processed data, the second thread activation semaphore and the second input queue activation semaphore. The second thread activation semaphore activates the second thread and the second input queue activation semaphore activates the second input queue. In an embodiment, the second thread activation semaphore and the second input queue activation semaphore is received from any other thread of the set of threads or from a processing unit external to the video hardware engine 100. In another embodiment, the first thread and the second thread share a common queue at the output and input respectively i.e. first output queue is coupled to the second input queue. Thus, a single queue connects an output of the first thread and an input of the second thread.

Each thread of the set of threads is an interrupt. Since each thread is associated with an input queue and an output queue, and each thread is activated by a thread activation semaphore and each input queue is activated by an input queue activation semaphore, the set of threads form a nested interrupt. This eliminates a requirement of an operating system in the controller 102.

A thread is activated when it receives a thread activation semaphore and a data that is required to be processed by the thread in the input queue. The thread processes the data and provides a processed data to an output queue. A conflict in the priority of thread does not happen in the controller 102, since each thread has a predefined priority. Also, a contention to activate an input queue does not happen in the controller 102 since each input queue has an associated input queue semaphore. Thus, an input queue which is required to be activated will be activated by providing the input queue semaphore.

The controller 102 operates in the decode mode when the controller 102 receives a compressed bit-stream and decode attributes associated with each frame of the plurality of frames. Each frame is divided in the plurality of slices. The controller 102 processes the decode attributes associated with a frame of the plurality of frames and generate decode parameters associated with the frame. The controller 102 also configures the video hardware accelerator unit 104 to process the compressed bit-stream associated with the frame based on the decode parameters associated with the frame. The video hardware accelerator unit 104 generates an output which is processed by the controller 102 and the controller 102 generates the frame and the decode status.

In one embodiment, the controller 102 receives the compressed bit-stream corresponding to each of a previous frame, a current frame and a next frame. In an embodiment, the controller 102 performs a set of predefined tasks in parallel. The set of predefined tasks are explained now. The controller 102 schedules compressed bit-stream corresponding to each frame of the plurality of frames. The controller 102 process decode attributes associated with the next frame to generate decode parameters associated with the next frame.

The controller 102 processes a plurality of slices associated with the current frame. The controller 102 configures the video hardware accelerator unit 104 to process the compressed bit-stream corresponding to the current frame based on the decode parameters associated with the current frame. The video hardware accelerator unit 104 processes the compressed bit-stream corresponding to the previous frame to generate an output which is processed by the controller 102 to generate a previous frame and a decode status corresponding to the previous frame.

The controller 102 is configured to collate a set of frames of the plurality of frames and the decode status associated with the set of frames to generate a collated set of frames and a collated decode status. The controller 102 communicates with a processing unit external to the video hardware engine 100 and provides the collated set of frames and the collated decode status associated with the set of frames to the processing unit.

These set of predefined tasks are performed by the controller 102 in parallel. In an embodiment, a plurality of predefined tasks performed by the controller 102 is in parallel. The specifically disclosed operations and sequences of the predefined tasks are provided to explain the logical flow of functioning of the controller 102 and are understood not to limit the scope of the present disclosure.

The controller 102 includes the set of threads and a thread of the set of threads is associated with one or more predefined tasks of the set of predefined tasks. The operation of the controller 102 in the decode mode is now explained with the help of threads. In one version, the set of threads include a communication thread, a kernel thread, a frame thread, a hardware thread and a slice thread. The communication thread communicates with the processing unit external to the video hardware engine 100. The kernel thread schedules compressed bit-stream corresponding to each frame of the plurality of frames. The frame thread processes decode attributes associated with a frame of the plurality of frames and generate decode parameters associated with the frame. The hardware thread configures the video hardware accelerator unit 104 to process the compressed bit-stream associated with the frame based on the decode parameters associated with the frame. The slice thread processes a plurality of slices associated with the frame.

The frame thread processes the output of the video hardware accelerator unit 104 to generate the frame and the decode status associated with the frame. The kernel thread collates the set of frames of the plurality of frames and the decode status associated with the set of frames to generate the collated set of frames and the collated decode status. The communication thread provides the collated set of frames and the collated decode status associated with the set of frames to the processing unit.

Other aspects such as queues and activation semaphores discussed earlier in the description, is applicable irrespective of the decode mode or encode mode of the controller 102 and hence not discussed here for brevity of the description.

Thus, the controller 102 in the video hardware engine 100 is capable of multi-threading without the use of an operating system. In an embodiment, all the functionality of the threads such as data to be processed by the threads, the order of activation of threads, the priority of the threads is fixed in the controller 102, both for the encode mode and the decode mode. The controller 102 can accomplish a similar task in very less number of cycles which a processing unit with an operating system would accomplish in large number of cycles. The controller 102, in one example, is a low end processor with no operating system. The controller 102, in another example, uses a low size (~500 Kb) on-chip memory for multi-threading and scheduling of threads. This drastically reduces the cost and power requirement of the video hardware engine 100. The video hardware engine 100 is very effective for applications such as video surveillance, video conferencing, high speed cameras and camcorders.

Figure 2:
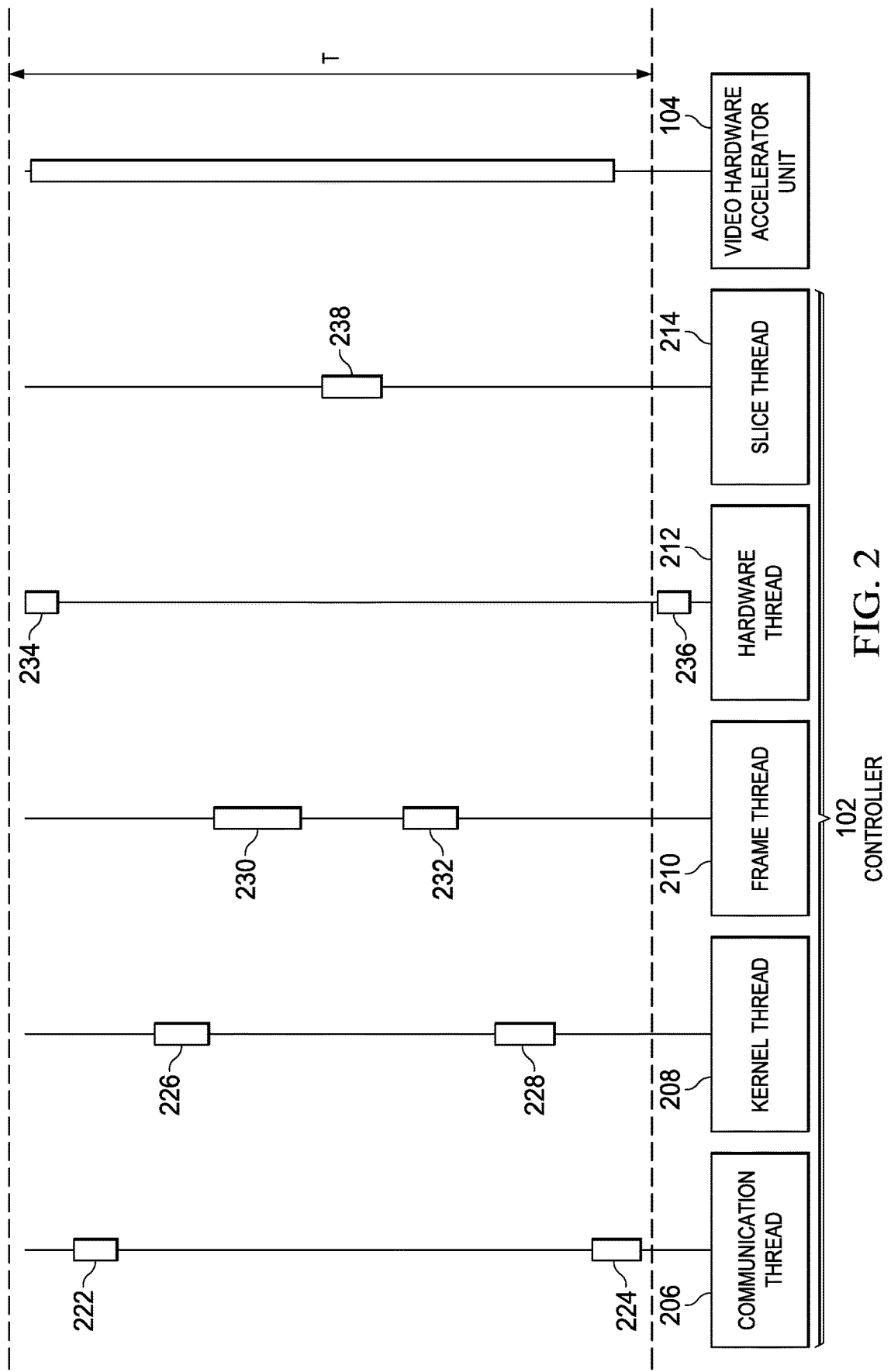
FIG. 2 illustrates a timing diagram of video hardware engine, according to an embodiment.

FIG. 2 illustrates a timing diagram of video hardware engine 100, according to an embodiment. In an example, the controller 102 includes a set of threads. The set of threads include a communication thread 206, a kernel thread 208, a frame thread 210, a hardware thread 212 and a slice thread 214. The threads illustrated in FIG. 2 are according to an example and is understood not to limit the scope of the present disclosure.

The operation of the controller 102 in the encode mode is now explained with the help of threads illustrated in FIG. 2. In the encode mode, the controller 102 receives a plurality of frames and encode attributes from a processing unit external to the video hardware engine 100. In one example, the controller 102 receives the plurality of frames and the plurality of frames includes a previous frame, a current frame and a next frame. At time instant 234, the hardware thread 212 configures the video hardware accelerator unit 104 to process the current frame based on encode parameters associated with the current frame. At time instant 222, the communication thread 206 communicates with a processing unit external to the video hardware engine 100. At time instant 226, the kernel thread 208 schedules each frame of the plurality of frames received by the controller 102. In one version, when the controller 102 receives the plurality of frames, the kernel thread 208 schedules similar frame together. In one example, the kernel thread 208 schedule H.264 video format frames followed by MPEG 2 video format frames. In another example, the kernel thread 208 schedules the plurality of frames based on multiple factors such as, but not limited to, video hardware engine utilization, lowest latency and order of the frames. In an additional example, the kernel thread 208 schedules the plurality of frames on first-come first-serve basis and/or last-come first-serve basis. At time instant 230, the frame thread 210 processes encode attributes associated with the next frame and generate encode parameters associated with the next frame. At time instant 238, the slice thread 214 processes a slice associated with the current frame. In one version, the slice thread 214 processes multiple slices associated with the current frame during a time frame T. The video hardware accelerator unit 104 processes the current frame during the time frame T. The hardware thread 212, in one version, receives the slices (associated with the current frame) processed by the slice thread 214 and provides these processed slices to the video hardware accelerator unit 104.

The frame thread 210 at time instant 232 is configured to process an output of the video hardware accelerator unit 104 to generate corresponding to the previous frame; a compressed bit-stream and an encode status. The output of the video hardware accelerator unit 104 is generated in response to a processing of the previous frame by the video hardware accelerator unit 104. At time instant 228, the kernel thread 208 collates a compressed bit-stream and an encode status associated with a set of frames of the plurality of frames to generate a collated compressed bit-stream and a collated encode status. In one example, the kernel thread 208 collates H.264 video format frames and the corresponding encode status associated with the H.264 video format frames. In another example, the kernel thread 208 collates the plurality of frames based on multiple factors such as, but not limited to, video hardware engine utilization, lowest latency and order of the frames. In an additional example, the kernel thread 208 collates the plurality of frames on first-come first-serve basis and/or last-come first-serve basis. At time instant 224, the communication thread 206 communicates with a processing unit external to the video hardware engine 100 and provides the collated compressed bit-stream and the collated encode status associated with the set of frames to the processing unit. At time instant 236, the hardware thread 212 configures the video hardware accelerator unit 104 to process the next frame based on encode parameters associated with the next frame. The width of the time instants such as 222, 226 and 232 illustrated in FIG. 2 are according to an example and is understood not to limit the scope of the present disclosure.

The controller 102 includes the set of threads. The set of threads, in one example, include the communication thread, the kernel thread, the frame thread, the hardware thread and the slice thread. The following description describe in details the operation of the set of threads in encode mode. It is understood that the operation of threads would be similar in both the encode mode and the decode mode. In encode mode, the set of threads process the plurality of frames and encode attributes associated with each frame of the plurality of frames. Similarly, in decode mode, the set of threads process the compressed bit-stream and decode attributes associated with each frame of the plurality of frames. Hence, the encode mode and the decode mode are analogous. Therefore, the operation of the threads in decode mode is not explained for brevity of the description. Indeed, those skilled in the art will appreciate that one or more of the features, operations, processes, characteristics, or other qualities of a specifically disclosed thread may be removed, replaced, added to, or changed without exceeding the scope of the present disclosure.

Figure 3:
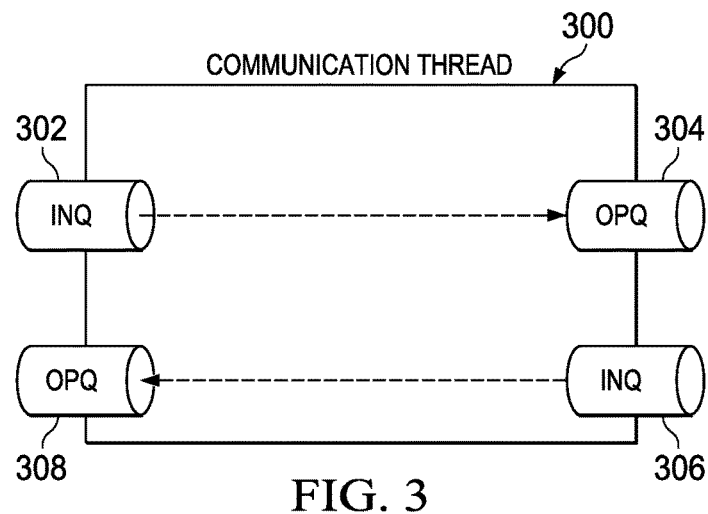
FIG. 3 is a block diagram to illustrate an operation of a communication thread, according to an embodiment.

FIG. 3 is a block diagram to illustrate an operation of a communication thread 300, according to an embodiment. The communication thread 300 includes a first input queue (INQ) 302 and a first output queue (OPQ) 304. The communication thread 300 further includes a second INQ 306 and a second OPQ 308. The operation of communication thread 300 is discussed in connection with the video hardware engine 100 illustrated in FIG. 1.

The communication thread 300 communicates with a processing unit external to the video hardware engine 100. The communication thread receives a plurality of frames, encode attributes associated with each frame of the plurality of frames, a communication thread activation semaphore and a communication first input queue (INQ) activation semaphore in a first INQ 302. The first INQ activation semaphore activates the first INQ 302 and the communication thread activation semaphore activates the communication thread 300. The communication thread 300 provides the plurality of frames, the encode attributes associated with each frame, a kernel thread activation semaphore and a kernel first input queue activation semaphore to a first OPQ 304.

The communication thread 300 also receives a collated compressed bit-stream and a collated encode status associated with a set of frames of the plurality of frames, the communication thread activation semaphore and a communication second INQ activation semaphore in a second INQ 306. The second INQ activation semaphore activates the second INQ 306 and the communication thread activation semaphore activates the communication thread 300. The communication thread 300 provides the collated compressed bit-stream and the encode status associated with the set of frames to the second OPQ 308 and subsequently to the processing unit external to the video hardware engine 100.

Figure 4:
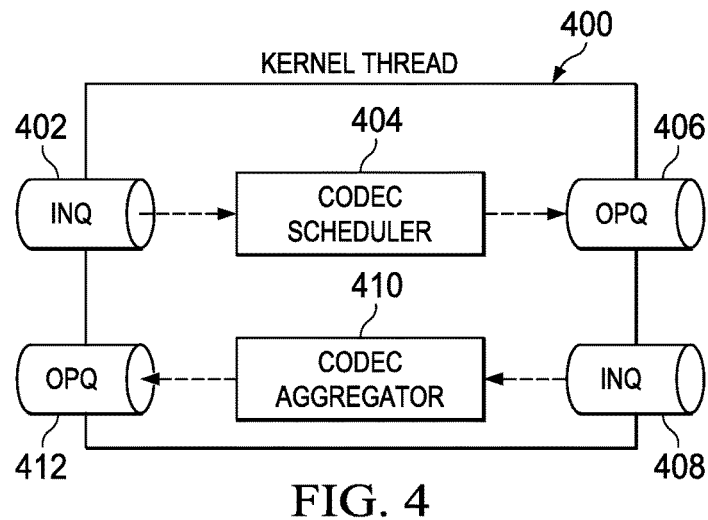
FIG. 4 is a block diagram to illustrate an operation of a kernel thread, according to an embodiment.

FIG. 4 is a block diagram to illustrate an operation of a kernel thread 400, according to an embodiment. The kernel thread 400 includes a first INQ 402. A codec scheduler 404 is coupled to the first INQ 402, and a first OPQ 406 is coupled to the codec scheduler 404. The kernel thread 400 includes a second INQ 408. A codec aggregator 410 is coupled to the second INQ 408. A second OPQ 412 is coupled to the codec aggregator 410. The operation of kernel thread 400 is discussed in connection with the video hardware engine 100 illustrated in FIG. 1.

The kernel thread 400 receives a plurality of frames, encode attributes associated with each frame of the plurality of frames, a kernel thread activation semaphore and a kernel first INQ activation semaphore in the first INQ 402. In an example, the kernel thread 400 receives these from the first OPQ 304 associated with the communication thread 300. In another example, the first OPQ 304 of the communication thread 300 is coupled to the first INQ 402. The kernel first INQ activation semaphore activates the first INQ 402, and the kernel thread activation semaphore activates the kernel thread 400.

The kernel thread 400 schedules each frame of the plurality of frames. In one example, the codec scheduler 404 receives the plurality of frames and the encode attributes associated with each frame. The codec scheduler 404 schedules each frame of the plurality of frames. In one example, the kernel thread 400 schedule H.264 video format frames followed by MPEG 2 video format frames. In another example, the codec scheduler 404 schedules the plurality of frames based on multiple factors such as, but not limited to, video hardware engine utilization, lowest latency and order of the frames. In an additional example, the codec scheduler 404 schedules the plurality of frames on first-come first-serve basis and/or last-come first-serve basis. The kernel thread 400 provides a frame of the plurality of frames, encode attributes associated with the frame, a frame thread activation semaphore and a frame first INQ activation semaphore to a first OPQ 406.

The kernel thread 400 also receives compressed bit-stream associated with a frame, the encode status associated with the frame, the kernel thread activation semaphore, the kernel second INQ activation semaphore in the second INQ 408. The kernel second INQ activation semaphore activates the second INQ 408, and the kernel thread activation semaphore activates the kernel thread 400.

The kernel thread 400 collates a compressed bit-stream and an encode status associated with a set of frames of the plurality of frames. The kernel thread 400 generates a collated compressed bit-stream and a collated encode status. In one version, the codec aggregator 410 receives the compressed bit-stream and the encode status associated with the frame. The codec aggregator 410 collates the compressed bit-stream and the encode status associated with the set of frames to generate the collated compressed bit-stream and the collated encode status. In one example, the kernel thread 400 collates H.264 video format frames and the corresponding encode status associated with the H.264 video format frames. In another example, the codec aggregator 410 collates the plurality of frames based on multiple factors such as, but not limited to, video hardware engine utilization, lowest latency and order of the frames. In an additional example, the codec aggregator 410 collates the plurality of frames on first-come first-serve basis and/or last-come first-serve basis.

The kernel thread 400 provides the collated compressed bit-stream and the collated encode status associated with the set of frames, a communication thread activation semaphore, and a communication second INQ activation semaphore to a second OPQ 412. In an example, the second OPQ 412 of the kernel thread 400 is coupled to the second INQ 306 of the communication thread 300.

Figure 5:
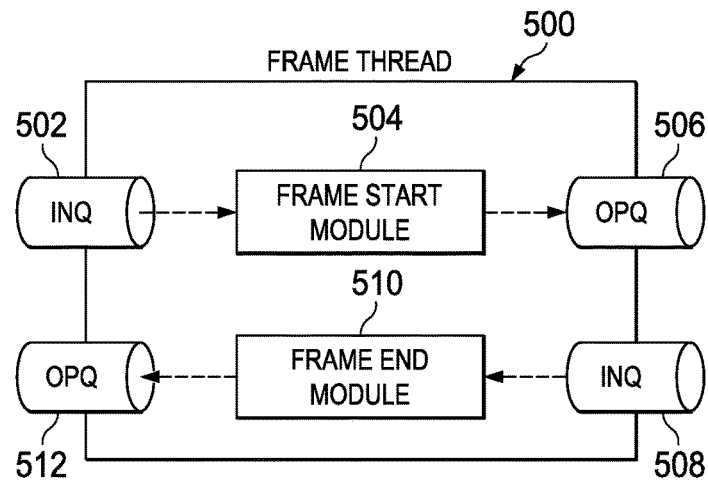
FIG. 5 is a block diagram to illustrate an operation of a frame thread, according to an embodiment.

FIG. 5 is a block diagram to illustrate an operation of a frame thread 500, according to an embodiment. The frame thread 500 includes a first INQ 502. A frame start module 504 is coupled to the first INQ 502, and a first OPQ 506 is coupled to the frame start module 504. The frame thread 500 includes a second INQ 508. A frame end module 510 is coupled to the second INQ 508. A second OPQ 512 is coupled to the frame end module 510. The operation of frame thread 500 is discussed in connection with the video hardware engine 100 illustrated in FIG. 1.

The frame thread 500 receives a frame, encode attributes associated with the frame, a frame thread activation semaphore and a frame first INQ activation semaphore in the first INQ 502. In an example, the frame thread 500 receives these from the first OPQ 406 associated with the kernel thread 400. In another example, the first OPQ 406 of the kernel thread 400 is coupled to the first INQ 502. The frame first INQ activation semaphore activates the first INQ 502, and the frame thread activation semaphore activates the frame thread 500.

The frame thread 500 processes the encode attributes associated with the frame and generates encode parameters associated with the frame. In one example, the frame start module 504 processes the encode attributes associated with the frame and generates encode parameters associated with the frame. The frame thread 500 provides the encode parameters associated with the frame, a hardware thread activation semaphore and a hardware first INQ activation semaphore to a first OPQ 506.

The frame thread 500 receives an output of the video hardware accelerator engine (for example, video hardware accelerator engine 104), the frame thread activation semaphore, the frame second INQ activation semaphore in the second INQ 508. The frame second INQ activation semaphore activates the second INQ 508, and the frame thread activation semaphore activates the frame thread 500.

The frame thread 500 processes an output of the video hardware accelerator unit 104 to generate a compressed bit-stream and an encode status associated with the frame. In one version, the frame end module 510 processes the output of the video hardware accelerator unit 104 to generate a compressed bit-stream and an encode status associated with the frame The frame thread 500 provides the compressed bit-stream and the encode status associated with the frame, a kernel thread activation semaphore, a kernel second INQ activation semaphore to a second OPQ 512. In an example, the second OPQ 512 of the frame thread 500 is coupled to the second INQ 408 of the kernel thread 400.

Figure 6:
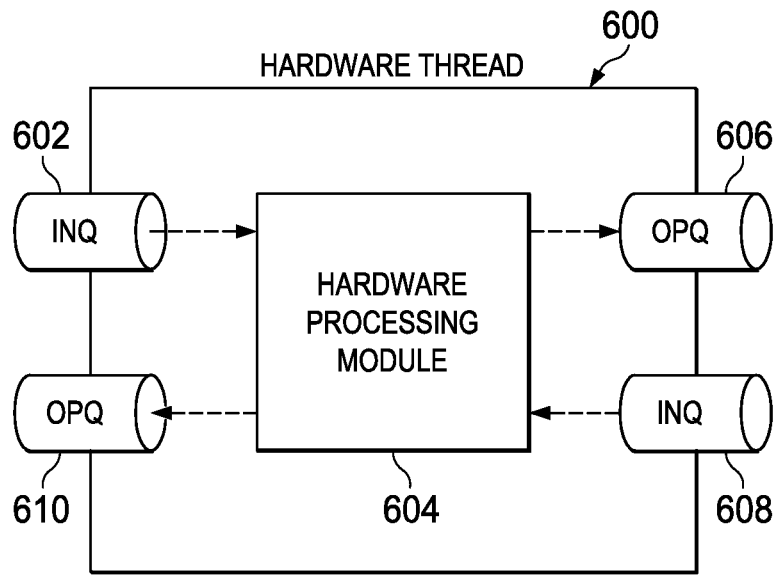
FIG. 6 is a block diagram to illustrate an operation of a hardware thread, according to an embodiment.

FIG. 6 is a block diagram to illustrate an operation of a hardware thread 600, according to an embodiment. The hardware thread 600 includes a first INQ 602. A hardware processing module 604 is coupled to the first INQ 602, and a first OPQ 606 is coupled to the hardware processing module 604. The hardware thread 600 includes a second INQ 608. The hardware processing module 604 is coupled to the second INQ 608. A second OPQ 610 is coupled to the hardware processing module 604. The operation of hardware thread 600 is discussed in connection with the video hardware engine 100 illustrated in FIG. 1.

The hardware thread 600 receives encode attributes associated with the frame, a hardware thread activation semaphore and a hardware first INQ activation semaphore in the first INQ 602. In an example, the hardware thread 600 receives these from the first OPQ 506 associated with the frame thread 500. In another example, the first OPQ 506 of the frame thread 500 is coupled to the first INQ 602. The hardware first INQ activation semaphore activates the first INQ 602, and the hardware thread activation semaphore activates the hardware thread 600.

The hardware thread 600 configures the video hardware accelerator unit 104 to process the frame based on the encode parameters associated with the frame. In one example, the hardware processing module 604 process the frame based on the encode parameters associated with the frame. The hardware thread 600 provides a slice information associated with the frame, a slice thread activation semaphore and a slice first INQ activation semaphore to a first OPQ 606.

The hardware thread 600 receives a processed slice information associated with the frame, a hardware thread activation semaphore and a hardware second input queue activation semaphore in the second INQ 608. The hardware second INQ activation semaphore activates the second INQ 608, and the hardware thread activation semaphore activates the hardware thread 600.

The hardware thread 600 provides the processed slice information associated with the frame to the video hardware accelerator unit 104. The hardware thread 600 receives an output of the video hardware accelerator unit 104. In one version, the hardware processing module 604 receives the output of the video hardware accelerator unit 104.

The hardware thread 600 provides the output of the video hardware accelerator unit 104, a frame thread activation semaphore, a frame second INQ activation semaphore, to a second OPQ 610. In an example, the second OPQ 610 of the hardware thread 600 is coupled to the second INQ 508 of the frame thread 500.

Figure 7:
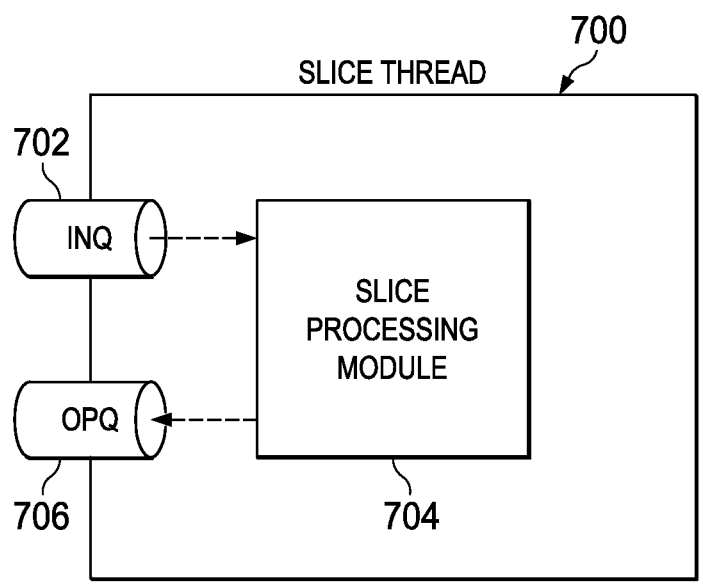
FIG. 7 is a block diagram to illustrate an operation of a slice thread, according to an embodiment.

FIG. 7 is a block diagram to illustrate an operation of a slice thread 700, according to an embodiment. The slice thread 700 includes a first INQ 702. A slice processing module 704 is coupled to the first INQ 702, and a first OPQ 706 is coupled to the slice processing module 704. The operation of slice thread 700 is discussed in connection with the video hardware engine 100 illustrated in FIG. 1.

The slice thread 700 receives a slice information associated with a frame, a slice thread activation semaphore and a slice first INQ activation semaphore in the first INQ 702. In an example, the slice thread 700 receives these from the first OPQ 606 associated with the hardware thread 600. In another example, the first OPQ 606 of the hardware thread 600 is coupled to the first INQ 702. The slice first INQ activation semaphore activates the first INQ 702, and the slice thread activation semaphore activates the slice thread 700.

The slice thread 700 processes the slice information associated with the frame and generates a processed slice information. In one example, the slice processing module 704 processes the slice information associated with the frame and generates the processed slice information. The slice thread 700 provides the processed slice information, a slice thread activation semaphore and a slice first INQ activation semaphore to a first OPQ 706. In an example, the first OPQ 706 of the slice thread 700 is coupled to the second INQ 608 of the hardware thread 600.

Figure 8:
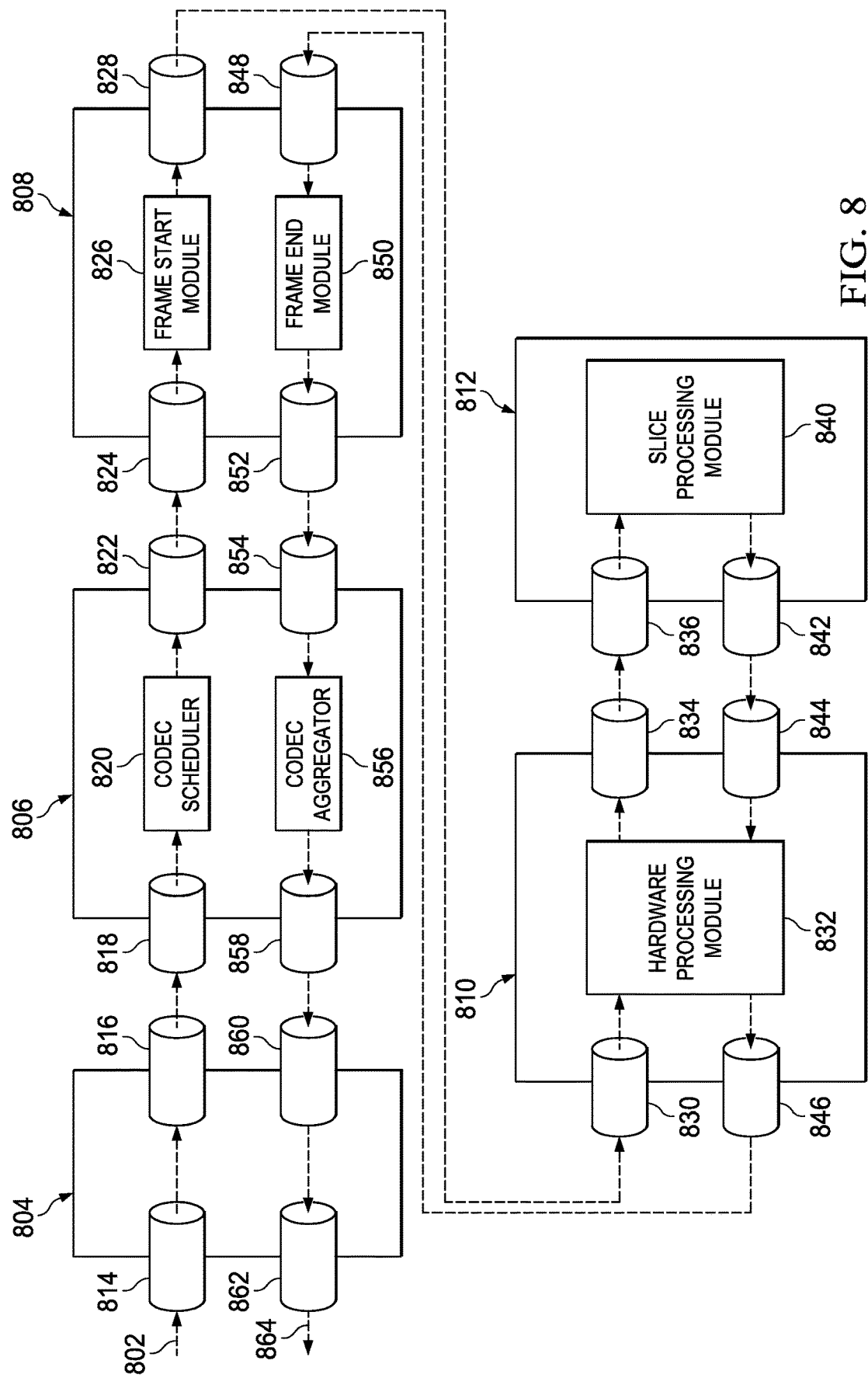
FIG. 8 illustrates a block diagram to illustrate an operation of the controller in FIG. 1.

FIG. 8 illustrates a block diagram to illustrate an operation of the controller in FIG. 1, according to an embodiment. The controller 102 includes a set of threads. The set of threads include a communication thread 804, a kernel thread 806, a frame thread 808, a hardware thread 810 and a slice thread 812. The threads illustrated in FIG. 8 are according to an example and is understood not to limit the scope of the present disclosure. In another example, the controller 102 includes a plurality of threads. Each thread of the set of the threads is represented as a block diagram in FIG. 8. Additionally, each thread has associated input queues. It is understood (as described earlier in this description) that each thread receives a thread activation semaphore and an input queue activation semaphore along with a set of inputs. Therefore, they have not been included in the following description for brevity.

The communication thread 804 communicates with a processing unit external to the video hardware engine 100. The communication thread 804 receives a set of inputs 802. The set of inputs 802 include a plurality of frames and encode attributes associated with each frame of the plurality of frames a first INQ 814. The communication thread 804 provides the plurality of frames and the encode attributes associated with each frame to a first OPQ 816.

The kernel thread 806 receives the plurality of frames and encode attributes associated with each frame in the first INQ 818 from the first OPQ 816. In one version, a single queue exists between an output of the communication thread 804 and an input of the kernel thread 806 i.e. the first INQ 818 and the first OPQ 816 form a single queue. The kernel thread 806 schedules each frame of the plurality of frames. In one example, the codec scheduler 820 receives the plurality of frames and the encode attributes associated with each frame. The codec scheduler 820 schedules each frame of the plurality of frames. The kernel thread 806 provides a frame of the plurality of frames and the encode attributes associated with the frame to a first OPQ 822.

The frame thread 808 receives the frame and the encode attributes associated with the frame in the first INQ 824. In one version, the first INQ 824 and the first OPQ 822 form a single queue. The frame thread 808 process the encode attributes associated with the frame and generate encode parameters associated with the frame. In one example, the frame start module 826 process the encode attributes associated the frame and generate encode parameters associated with the frame. The frame thread 808 provides the encode parameters associated with the frame to a first OPQ 828.

The hardware thread 810 receives encode attributes associated with the frame in the first INQ 830. In one version, the first INQ 830 and the first OPQ 828 form a single queue. The hardware thread 810 configures the video hardware accelerator unit 104 to process the frame based on the encode parameters associated with the frame. In one example, the hardware processing module 832 processes the frame based on the encode parameters associated with the frame. The hardware thread 810 provides a slice information associated with the frame to a first OPQ 834.

The slice thread 812 receives the slice information associated with a frame in the first INQ 836. In one version, the first INQ 836 and the first OPQ 834 form a single queue. The slice thread 812 processes the slice information associated with the frame and generates a processed slice information. In one example, the slice processing module 840 processes the slice information associated with the frame and generates the processed slice information. The slice thread 812 provides the processed slice information to a first OPQ 842.

The hardware thread 810 receives the processed slice information associated with the frame in the second INQ 844. In one version, the second INQ 844 and the first OPQ 842 form a single queue. The hardware thread 810 provides the processed slice information associated with the frame to the video hardware accelerator unit 104. The hardware thread 810 receives an output of the video hardware accelerator unit 104. In one version, the hardware processing module 832 receives the output of the video hardware accelerator unit 104. The hardware thread 810 provides the output of the video hardware accelerator unit 104 to a second OPQ 846.

The frame thread 808 receives the output of the video hardware accelerator unit 104 in the second INQ 848. In one version, the second INQ 848 and the second OPQ 846 form a single queue. The frame thread 808 processes an output of the video hardware accelerator unit 104 to generate a compressed bit-stream and an encode status associated with the frame. In one version, the frame end module 850 processes the output of the video hardware accelerator unit 104 to generate a compressed bit-stream and an encode status associated with the frame. The frame thread 808 provides the compressed bit-stream and the encode status associated with the frame to a second OPQ 852.

The kernel thread 806 receives the compressed bit-stream and the encode status associated with the frame in the second INQ 854. In one version, the second INQ 854 and the second OPQ 852 form a single queue. The kernel thread 806 collates a compressed bit-stream and an encode status associated with a set of frames of the plurality of frames. The kernel thread 806 generates a collated compressed bit-stream and a collated encode status. In one version, a codec aggregator 856 receives the compressed bit-stream and the encode status associated with the frame. The codec aggregator 856 collates the compressed bit-stream and the encode status associated with the set of frames to generate a collated compressed bit-stream and a collated encode status. The kernel thread 806 provides the collated compressed bit-stream and the collated encode status associated with the set of frames to a second OPQ 858.

The communication thread 804 receives the collated compressed bit-stream and the collated encode status associated with the set of frames in a second INQ 860. In one version, the second INQ 860 and the second OPQ 858 form a single queue. The communication thread 804 provides the collated compressed bit-stream and the collated encode status associated with the set of frames to a second OPQ 862. The communication thread 804 provides a set of outputs 864 to the processing unit external to the video hardware engine 100. The set of outputs 864 include the collated compressed bit-stream and the encode status associated with the set of frames.

The specifically disclosed operations and sequences of activation of the set of threads are provided to explain the logical flow of methods and are understood not to limit the scope of the present disclosure. The sequence of activation of threads is such that the processing requirement of the controller 102 in optimized. In one version, the order of operation of the set of threads is different from the one illustrated in FIG. 8. In one example, the slice thread 812 is between the frame thread 808 and the hardware thread 810. In another version, two threads can be represented to operate in parallel. For example, the frame thread 808 and the slice thread 812 operate in parallel and provide and/or receive data from the hardware thread 810 in parallel. It is noted that the operation of the controller 102 illustrated in FIG. 8 is one of the many ways of operating the controller 102 and variations, and alternative constructions are apparent and well within the spirit and scope of the disclosure.

Modifications are possible in the described embodiments, and other embodiments are possible, within the scope of the claims.

What is claimed is:

1. A video hardware engine comprising:
    a video hardware accelerator unit; and
    a controller coupled to the video hardware accelerator unit and configured to operate in an encode mode to:
        receive a plurality of frames and encode attributes associated with each frame of the plurality of frames, each frame divided in a plurality of slices;
        process the encode attributes associated with a frame of the plurality of frames to generate encode parameters associated with the frame;
        execute a first thread to process the frame based on the encode parameters to generate an output;
        execute a second thread to process a next frame encode attributes to generate next frame encode parameters; and process on the second thread the output of the video hardware accelerator unit to generate, corresponding to a previous frame, a compressed bit-stream and a previous frame encode status;
wherein the first thread and the second thread are parallel threads.

2. The video hardware engine of claim 1, wherein the frame of the plurality of frames is a current frame, wherein the plurality of frames includes the previous frame, the current frame and the next frame and the controller is configured to perform a set of predefined tasks in parallel, the set of predefined tasks comprises:
scheduling each frame of the plurality of frames;
the processing the next frame encode attributes to generate the next frame encode parameters;
processing a plurality of slices associated with the current frame;
the processing of the output of the video hardware accelerator unit to generate the compressed bit-stream and the previous frame encode status, wherein the output of the video hardware accelerator unit is generated in response to a processing of the previous frame by the video hardware accelerator unit;
collating the compressed bit-stream and the previous frame encode status to generate a collated compressed bit-stream and a collated encode status; and
communicating with a processing unit external to the video hardware engine and providing the collated compressed bit-stream and the collated encode status associated with the set of frames to the processing unit.

3. The video hardware engine of claim 2, wherein the controller is further configured to execute a set of threads and a thread of the set of threads is associated with one or more predefined tasks of the set of predefined tasks, and wherein the set of threads includes the first and second threads.

4. The video hardware engine of claim 3, wherein each thread of the set of threads has a predefined priority and each thread is configured not to operate in wait mode, yield mode and suspend mode.

5. The video hardware engine of claim 3, wherein a third thread has a first priority and a fourth thread has a second priority, the first priority is higher than the second priority, the third thread configured to complete a predefined task before initiating a subsequent predefined task, and wherein the third thread and the fourth thread are threads in the set of threads.

6. The video hardware engine of claim 5, wherein the fourth thread switches from the second priority to the first priority.

7. The video hardware engine of claim 2, wherein each predefined task of the set of predefined tasks has an input queue and an output queue.

8. The video hardware engine of claim 7, wherein:
an input queue and an output queue is associated with a thread when one predefined task is associated with the thread; and
multiple input queues and multiple output queues are associated with the thread when more than one predefined task is associated with the thread.

9. The video hardware engine of claim 3, wherein a thread activation semaphore is configured to activate a thread and an input queue activation semaphore is configured to activate an input queue.

10. The video hardware engine of claim 3, wherein each thread of the set of threads is an interrupt such that the set of threads form a nested interrupt eliminating a requirement of an operating system in the controller.

11. The video hardware engine of claim 3, wherein a third thread is associated with a first input queue and a first output queue, and a fourth thread is associated with a second input queue and a second output queue.

12. The video hardware engine of claim 11, wherein the first input queue associated with the third thread receives data, a first thread activation semaphore, a first input queue activation semaphore, and wherein the third thread is configured to process the data to generate processed data and configured to provide the processed data, a fourth thread activation semaphore, a second input queue activation semaphore to the first output queue.

13. The video hardware engine of claim 11, wherein the second input queue associated with the fourth thread receives processed data, the second thread activation semaphore and the second input queue activation semaphore.

14. The video hardware engine of claim 3, wherein the first thread is a hardware thread and the second thread is a frame thread, and wherein the set of threads comprises a communication thread, a kernel thread, the frame thread, the hardware thread and a slice thread.

15. The video hardware engine of claim 14, wherein:
the communication thread is configured to communicate with the processing unit external to the video hardware engine;
the kernel thread is configured to schedule each frame of the plurality of frames;
the frame thread is configured to process encode attributes associated with the current frame and generate encode parameters associated with the current frame;
the hardware thread configures the video hardware accelerator unit to process the current frame based on the encode parameters associated with the current frame; and
the slice thread is configured to process the plurality of slices associated with the current frame.

16. The video hardware engine of claim 14, wherein:
the frame thread is configured to process the output of the video hardware accelerator unit to generate the compressed bit-stream and the encode status associated with the current frame;
the kernel thread is configured to collate the compressed bit-stream and the encode status associated with a set of frames of the plurality of frames to generate the collated compressed bit-stream and the collated encode status; and
the communication thread is configured to provide the collated compressed bit-stream and the collated encode status associated with the set of frames to the processing unit.

17. A method comprising:
receiving a plurality of frames and encode attributes associated with each frame of the plurality of frames;
process the encode attributes associated with a frame of the plurality of frames to generate encode parameters associated with the frame;
executing a first thread to process the frame based on the encode parameters to generate an output executing a second thread to process a next frame encode attributes to generate next frame encode parameters; and
process on the second thread the output of the video hardware accelerator unit to generate, corresponding to a previous frame, a compressed bit-stream and a previous frame encode status;

wherein the first thread and the second thread are parallel threads.

18. The method of claim 17, wherein the frame of the plurality of frames is a current frame, and wherein receiving a plurality of frames further comprises:
receiving the previous frame, the current frame and the next frame; and
performing a set of predefined tasks in parallel, the set of predefined tasks comprising:
scheduling each frame of the plurality of frames;
processing the next frame encode to generate the next frame encode parameters;
processing a plurality of slices associated with the current frame;
processing the output of the video hardware accelerator unit to generate the compressed bit-stream and the previous frame encode status, wherein the output of the video hardware accelerator unit is generated in response to a processing of the previous frame by the video hardware accelerator unit;
collating the compressed bit-stream and the previous frame encode status to generate a collated compressed bit-stream and a collated encode status; and
communicating with a processing unit external to a video hardware engine and providing the collated compressed bit-stream and the collated encode status associated with the set of frames to the processing unit.

* * * * *